(12) United States Patent  (10) Patent No.: US 8,352,001 B2
Iwaki  (45) Date of Patent: Jan. 8, 2013

(54) PORTABLE ELECTRONIC DEVICE

(75) Inventor: Yoshihiro Iwaki, Tokyo (JP)

(73) Assignee: NEC Corporation, Tokyo (JP)

( * ) Notice: Subject to any disclaimer, the term of this patent is extended or adjusted under 35 U.S.C. 154(b) by 518 days.

(21) Appl. No.: 12/601,561

(22) PCT Filed: Mar. 27, 2008

(86) PCT No.: PCT/JP2008/055926
§ 371 (c)(1),
(2), (4) Date: Nov. 24, 2009

(87) PCT Pub. No.: WO2008/146530
PCT Pub. Date: Dec. 4, 2008

(65) Prior Publication Data
US 2010/0178963 A1 Jul. 15, 2010

(30) Foreign Application Priority Data

May 30, 2007 (JP) .................................. 2007-143781
Jan. 18, 2008 (JP) .................................. 2008-009267

(51) Int. Cl.
H04M 1/00 (2006.01)
(52) U.S. Cl. ..................................... 455/575.4; 455/566
(58) Field of Classification Search ............... 455/575.4, 455/575.1, 566
See application file for complete search history.

(56) References Cited

U.S. PATENT DOCUMENTS 7,546,150 B2 * 6/2009 Makino ....................... 455/575.1
7,564,967 B2 * 7/2009 Pan .............................. 379/433.12
7,684,822 B2 * 3/2010 Park et al. ................... 455/550.1
8,200,296 B2 * 6/2012 Arakane et al. ............. 455/575.3
2003/0114198 A1 * 6/2003 Han ............................. 455/566
2005/0272488 A1 * 12/2005 Zou ............................. 455/575.4
2006/0079303 A1 * 4/2006 Lee ............................. 455/575.4
2006/0135228 A1 * 6/2006 Kato ........................... 455/575.4
2007/0060220 A1 * 3/2007 Hsu ............................. 455/575.4
2009/0104942 A1 * 4/2009 Arakane et al. ............. 455/566

FOREIGN PATENT DOCUMENTS

| JP | 2003134205 A | 5/2003 |
| JP | 2006019925 A | 1/2006 |
| JP | 2006211576 A | 8/2006 |
| JP | 2007060059 A | 3/2007 |
| WO | 2006030607 A | 3/2006 |

OTHER PUBLICATIONS

International Search Report for PCT/JP2008/055926 mailed Jul. 1, 2008.

* cited by examiner

Primary Examiner — Christopher M Brandt

(57) ABSTRACT

An electronic portable device includes two housings 10 and 20 and a connecting mechanism which connects housings 10 and 20 so as to allow housings 10 and 20 to be shifted from one state to another state by a rotating operation, wherein the connecting mechanism has first guide groove 31 and second guide groove 32 formed in housing 10, third guide groove 33 and fourth guide groove 34 formed in housing 20, first shaft pin 41 penetrating guide grooves 31 and 33, and second shaft pin 42 penetrating guide grooves 32 and 34, wherein the guide grooves 31 to 34 form a circular arc, the guide grooves 31 and 32 are line-symmetric with respect to the center line of first housing 10 in the closed state; the guide grooves 33 and 34 are line-symmetric with respect to the center line of first housing 10 in the first open state.

7 Claims, 12 Drawing Sheets

FIG.1
-- PRIOR ART --
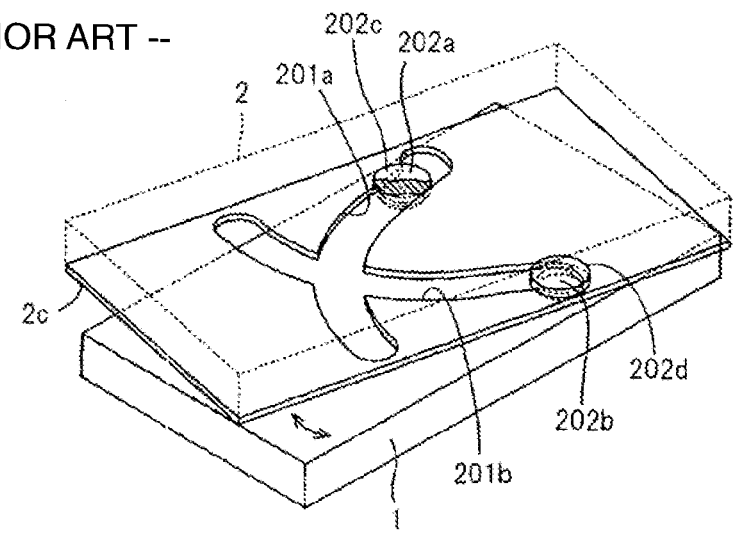
FIG.2  -- PRIOR ART --
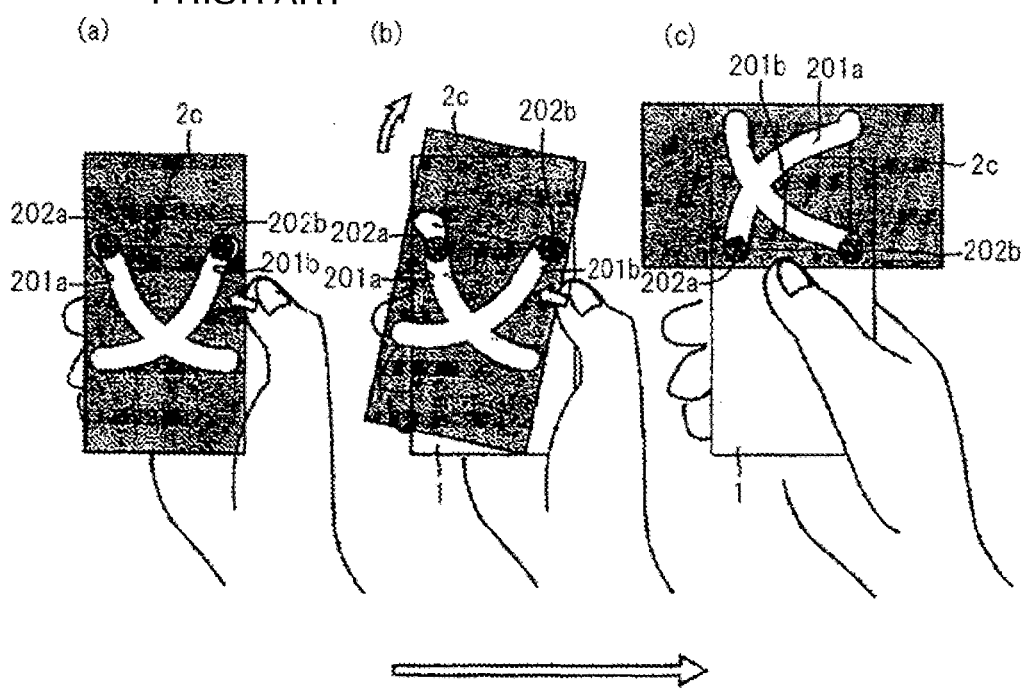

PORTABLE ELECTRONIC DEVICE

TECHNICAL FIELD

The present invention relates to a portable electronic device typified by a cellular phone or a PDA (Personal Digital Assistant), and in particular, to a connecting structure for at least two housings which configure the portable electronic device.

BACKGROUND ART

In recent years, one segment broadcasting, images for a personal computer application, and Web pages have been viewable on display sections of portable electronic devices. Thus, portable electronic devices have been prevailing which allow a housing with the display section to be rotated so as to place the display section in a horizontally long position.

Japanese Patent Laid-Open No. 2006-19925 discloses a portable information terminal including a first housing with an operation section, a second housing with a display section, and a rotational connecting mechanism connecting the first housing and second housing together so that the second housing slidably rotates with respect to the first housing. The rotational connecting mechanism disclosed in Japanese Patent Laid-Open No. 2006-19925 is configured to be shifted, by a rotational operation, a closed state or an open state to the other state; in the closed state, the second housing covers the entire operation section of the first housing, and in the open state, the second housing exposes the operation section of the first housing and becomes symmetric with respect to the center line of the first housing.

Moreover, Japanese Patent Laid-Open No. 2006-19925 discloses a rotational connecting mechanism shown in FIG. 1. The rotational connecting mechanism shown in FIG. 1 has first cam slot $201a$ and second cam slot $201b$ formed in bottom plate $2c$ of second housing 2, and first pin $202a$ and second pin $202b$ inserted through first cam slot $201a$ and second cam slot $201b$, respectively. First cam slot $201a$ and second cam slot $201b$ are shaped like two circular-arcuate slots crossing each other. On the other hand, first pin $202a$ and second pin $202b$ are fixed to the surface of first housing 1. First flange portion $202c$ and second flange portion $202d$ are provided at the tips of first pin $202a$ and second pin $202b$, respectively. First flange portion $202c$ and second flange portion $202d$ prevent first pin $202a$ and second pin $202b$, respectively, from slipping out from cam slot 201.

With reference to FIG. 2, the operation of first housing 1 and second housing 2 connected together by the rotational connecting mechanism shown in FIG. 1 will be described. According to Japanese Patent Laid-Open No. 2006-19925, in the closed state, second housing 2 covers the entire operation section of first housing 1 (FIG. 2($a$)). In the state shown in FIG. 2($a$), second housing 2 is pushed up by the thumb of the right hand gripping first housing 1. Then, first pin $202a$ slides along first cam slot $201a$. As a result, second housing 2 rotates clockwise around second pin $202b$ with respect to first housing 1 and shifts gradually with respect to first housing 1 (FIG. 2($b$)). When second housing 2 is rotated clockwise by 90° with respect to first housing 1, the operation section (not shown in the drawings) of first housing 1 is exposed, and second housing 2 becomes laterally symmetric with respect to the center line of first housing 1. At this time, the portable information terminal is externally shaped substantially like the character "T" (FIG. 2($c$)). Japanese Patent Laid-Open No. 2006-19925 states, in paragraph [0152], that first pin $202a$ and second pin $202b$ are fixed to the surface of first housing 1. Thus, the description, in Japanese Patent Laid-Open No. 2006-19925, that the "first pin $202a$ slides along first cam slot $201a$" is expected not to mean that first pin $202a$ actually slides but that first pin $202a$ slides relative to first cam slot $201a$.

DISCLOSURE OF THE INVENTION

Problems to be Solved by the Invention

The rotational connecting mechanism disclosed in Japanese Patent Laid-Open No. 2006-19925 described above poses the following problems. In the rotational connecting mechanism, whenever the operation section is exposed, the display section is in the horizontally long position. However, a vertically long display section is suitable for displaying a list such as a call register. This is because the vertically long display section can generally display more items in one screen than the horizontally long display section. Thus, if the user operates the operation section while viewing the displayed list, the amount of information displayed in the display section is smaller than in conventional flip phones.

Furthermore, in the rotational connecting mechanism, the cam slots are formed in one housing, whereas the pins are formed on the other housing. When one of the housings rotates with respect to the other housing, the pins slide along the cam slots. Consequently, the pivotal movement amount (pivotal movement range) of the housing depends on the length of the cam slots (circular arc length). Thus, the cam slots need to be extended in order to increase the pivotal movement amount of the housing. However, the extension of the cam slots increases the area of the cam slots. In other words, the size of the slots formed in the housing increases. The increased size of the slots formed in the housing reduces the rigidity of the housing, that is, the torsional rigidity of the housing. That is, in the rotational connecting mechanism disclosed in Patent Document 1, the rigidity of the housing decreases with the increasing rotation amount of the housing.

Furthermore, in the rotational connecting mechanism disclosed in Japanese Patent Laid-Open No. 2006-19925, the two cam slots cross each other. Thus, as each of the pins slides along the corresponding cam slot, the pin passes through the intersection point between the two cam slots. At this time, the pin may be caught on a corner near the intersection point between the cam slots or there may be unintended entry of the pin into the cam slot.

A main object of the present invention is to increase the rotatable ranges of the two housings connected together so as to be rotatable relative to each other, while avoiding reducing the rigidity of the housings.

One portable electronic device according to the present invention includes a first housing with a display section, a second housing with an operation section, and a connecting mechanism connecting the first housing and the second housing together. The connecting mechanism connects the first housing and the second housing together so as to allow the first housing and the second housing to be shifted, by a rotating operation, from a closed state, a first open state or a second open state to another state.

In the closed state, the operation section of the second housing is covered with the first housing. In the first open state, the operation section of the second housing is exposed, and the first housing is rotated by substantially 90 degrees with respect to the second housing. In the second open state, the operation section is exposed, and the first housing is further rotated by substantially 90 degrees from the first open state. In the first open state, opposite side surfaces of the first housing in a long side direction are positioned outside opposite side surfaces of the second housing in a short side direction.

Another portable electronic device according to the present invention includes a first housing with a display section, a second housing with an operation section, and a connecting mechanism rotatably connecting the first housing and the second housing together. The connecting mechanism connects the first housing and the second housing together so as to allow the first housing and the second housing to be shifted, by a rotating operation, from a closed state, a first open state or a second open state to another state.

In the closed state, the operation section of the second housing is covered with the first housing. In the first open state, the operation section is exposed, and center lines of the first housing and the second housing cross each other. In the second open state, the operation section is exposed, and the center line of the first housing aligns with the center line of the second housing.

The connecting mechanism includes a first guide groove and a second guide groove formed in the first housing, a third guide groove and a fourth guide groove formed in the second housing, a first shaft penetrating the first guide groove and the third guide groove, and a second shaft penetrating the second guide groove and the fourth guide groove.

The first guide groove and the second guide groove are line-symmetric with respect to the center line of the first housing serving as an axis of symmetry. The first guide groove is formed along a circular arc centered around a start point of the second guide groove. The second guide groove is formed along a circular arc centered around a start point of the first guide groove. The third guide groove and the fourth guide groove are line-symmetric with respect to the center line of the first housing in the first open state. The third guide groove is formed along a circular arc centered around a start point of the fourth guide groove. The fourth guide groove is formed along a circular arc centered around a start point of the third guide groove.

The above-described and other objects, features, and advantages of the present invention will be apparent with reference to the following description and attached drawings showing an example of the present invention.

BRIEF DESCRIPTION OF THE DRAWINGS

FIG. 1 is a schematic diagram showing a rotational connecting mechanism disclosed in Japanese Patent Laid-Open No. 2006-19925;

FIG. 2 is a schematic diagram showing how the rotational connecting mechanism disclosed in Japanese Patent Laid-Open No. 2006-19925 is operated over time;

FIG. 3 is an external perspective view showing a cellular phone as an exemplary embodiment, wherein FIG. 3(a) shows a closed state, FIG. 3(b) shows a first open state, and FIG. 3(c) shows a second open state;

BEST MODE FOR CARRYING OUT THE INVENTION

Exemplary Embodiment 1

Figure 3:
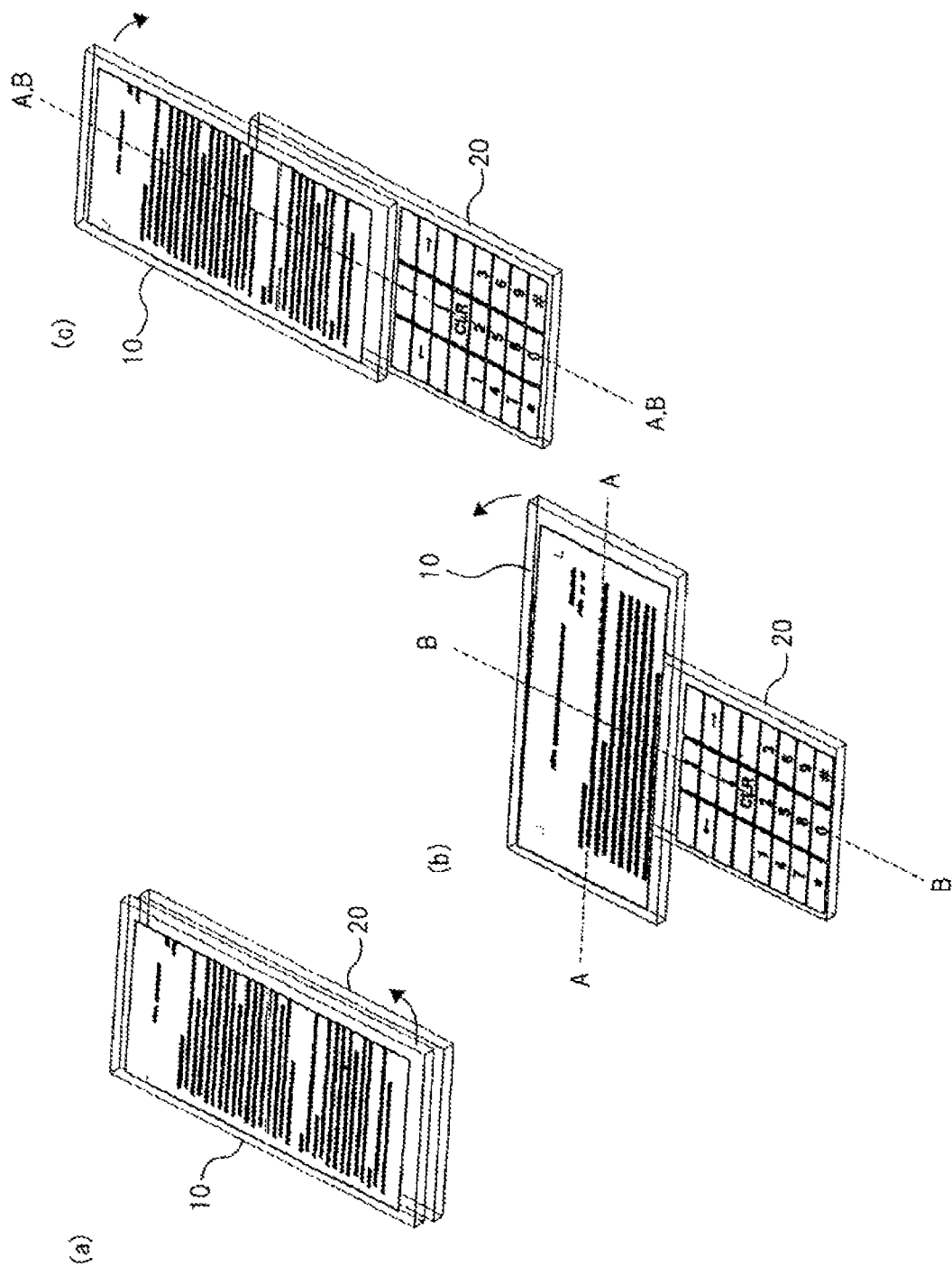

An exemplary embodiment will be described below in detail with reference to the drawings. A portable electronic device in the exemplary embodiment is a cellular phone including a first housing (hereinafter referred to as an "upper housing") in which a liquid crystal display serving as a display section is provided and a second housing (hereinafter referred to as a "lower housing") in which input keys and an input touch panel (hereinafter collectively referred to as "input keys") serving as an operation section are provided; the upper housing and the lower housing are rotatably connected together by a connecting mechanism. In the description below, a surface of the upper housing on which the liquid crystal display is provided is called a front surface. A surface of the upper housing located opposite the front surface is called a rear surface. Furthermore, a surface of the lower housing on which the input keys are provided is called a front surface. A surface of the lower housing located opposite the front surface is called a rear surface. For easy understanding, with reference to FIG. 3, the connected state and rotating operation of the upper housing and the lower housing will be described according to the above-described definitions.

Upper housing 10 and lower housing 20 are connected together by the connecting mechanism so as to be able to shift, by a rotational operation, from a closed state (FIG. 1(a)), a first open state (FIG. 1(b)) or a second open state (FIG. 1(c)) to another state. That is, upper housing 10 and lower housing 20 are connected together so as to be rotatable by up to 180 degrees.

In the closed state shown in FIG. 1(a), substantially the entire front surface (at least the area in which the input keys are arranged) of lower housing 20 is covered with upper housing 10. In the first open state shown in FIG. 1(b), the area of lower housing 20 in which the input keys are formed is exposed, and upper housing 10 becomes laterally symmetric with respect to center line B-B of lower housing 20. In the second open state shown in FIG. 1(c), the area of lower housing 20 in which the input keys are formed is exposed, and center line A-A of upper housing 10 aligns with center line B-B of lower housing 20 on the same straight line.

During the above-described rotating operation, upper housing 10 and lower housing 20 rotate in a plane parallel to the opposite surfaces thereof (the rear surface of upper housing 10 and the front surface of lower housing 20). Furthermore, center line A-A of upper housing 10 crosses each of the short sides of upper housing 10 at right angles to divide the short side into two portions. Center line B-B of lower housing 20 crosses each of the short sides of lower housing 20 at right angles to divide the short side into two portions.

Figure 4:
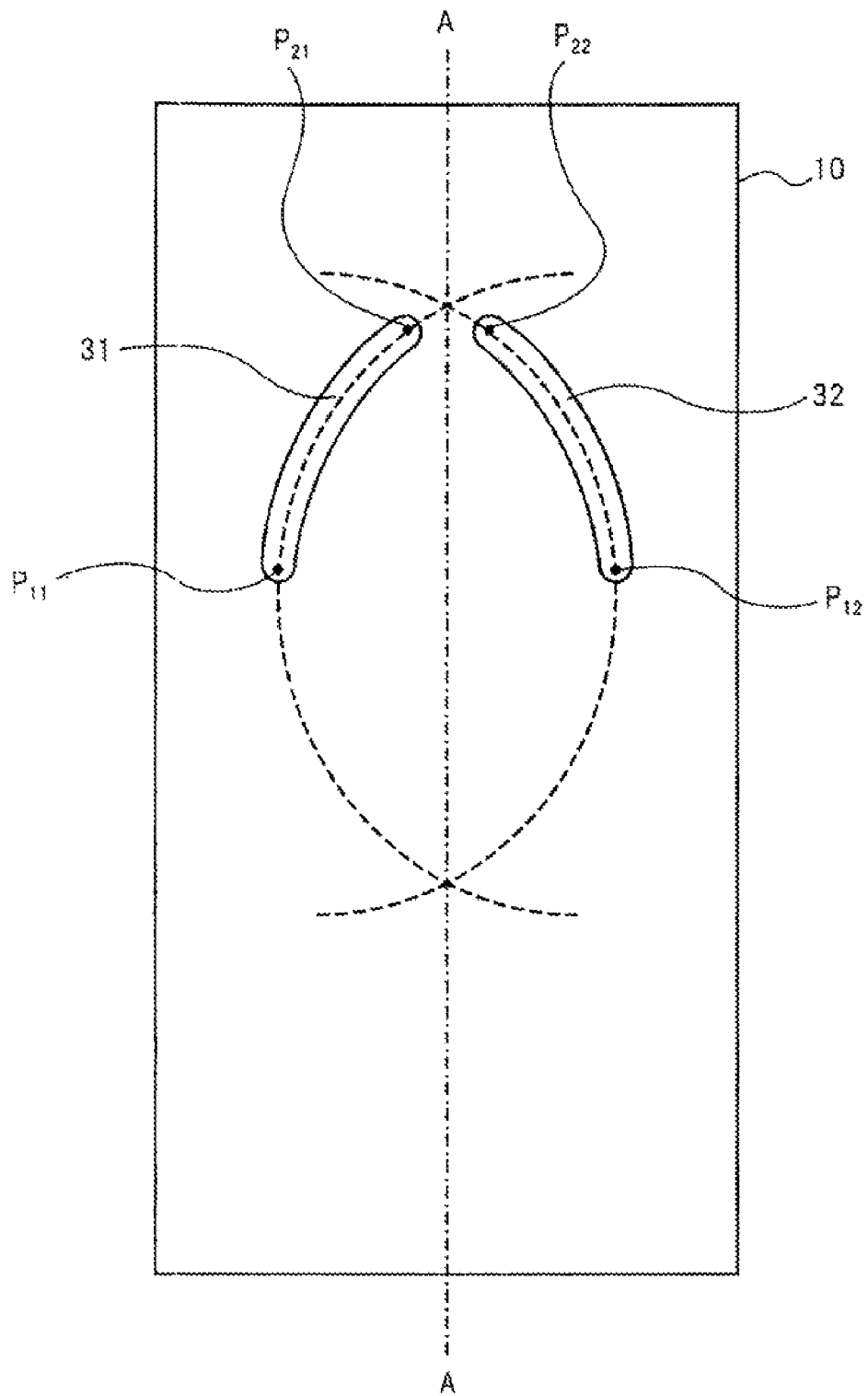
FIG. 4 is a schematic perspective view showing the rear surface of an upper housing.

FIG. 4 is a schematic perspective diagram showing the rear surface of upper housing 10. FIG. 4 shows the rear surface as seen through the front surface side. As shown in FIG. 4, first guide groove 31 and second guide groove 32 are formed in the rear surface of upper housing 10. First guide groove 31 and second guide groove 32 are line-symmetric with respect to center line A-A of upper housing 10, serving as the axis of symmetry.

Furthermore, first guide groove 31 is formed along a circular arc centered around one end (start point $P_{12}$) of second guide groove 32. Moreover, the length of the circular arc (the circular arc length of first guide groove 31) is a quarter of the circumference of a circle centered around start point $P_{12}$. One of the two ends of first guide groove 31 which lies relatively away from center line A-A corresponds to start point $P_{11}$. Of course, the circular arc length of first guide groove 31 may be shorter than a quarter of the circumference of a circle centered around start point $P_{12}$.

On the other hand, second guide groove 32 is formed along a circular arc centered around one end (start point $P_{11}$) of first guide groove 31. Moreover, the length of the circular arc (the circular arc length of second guide groove 32) is a quarter of the circumference of a circle centered around start point $P_{11}$. One of the two ends of second guide groove 32 which lies relatively away from center line A-A corresponds to start point $P_{12}$. Of course, the circular arc length of second guide groove 32 may be shorter than a quarter of the circumference of a circle centered around start point $P_{11}$.

Moreover, the circle centered around start point $P_{12}$ has the same radius as that of the circle centered around start point $P_{11}$. That is, first guide groove 31 and second guide groove 32 have the same length and the same radius of curvature.

Figure 5:
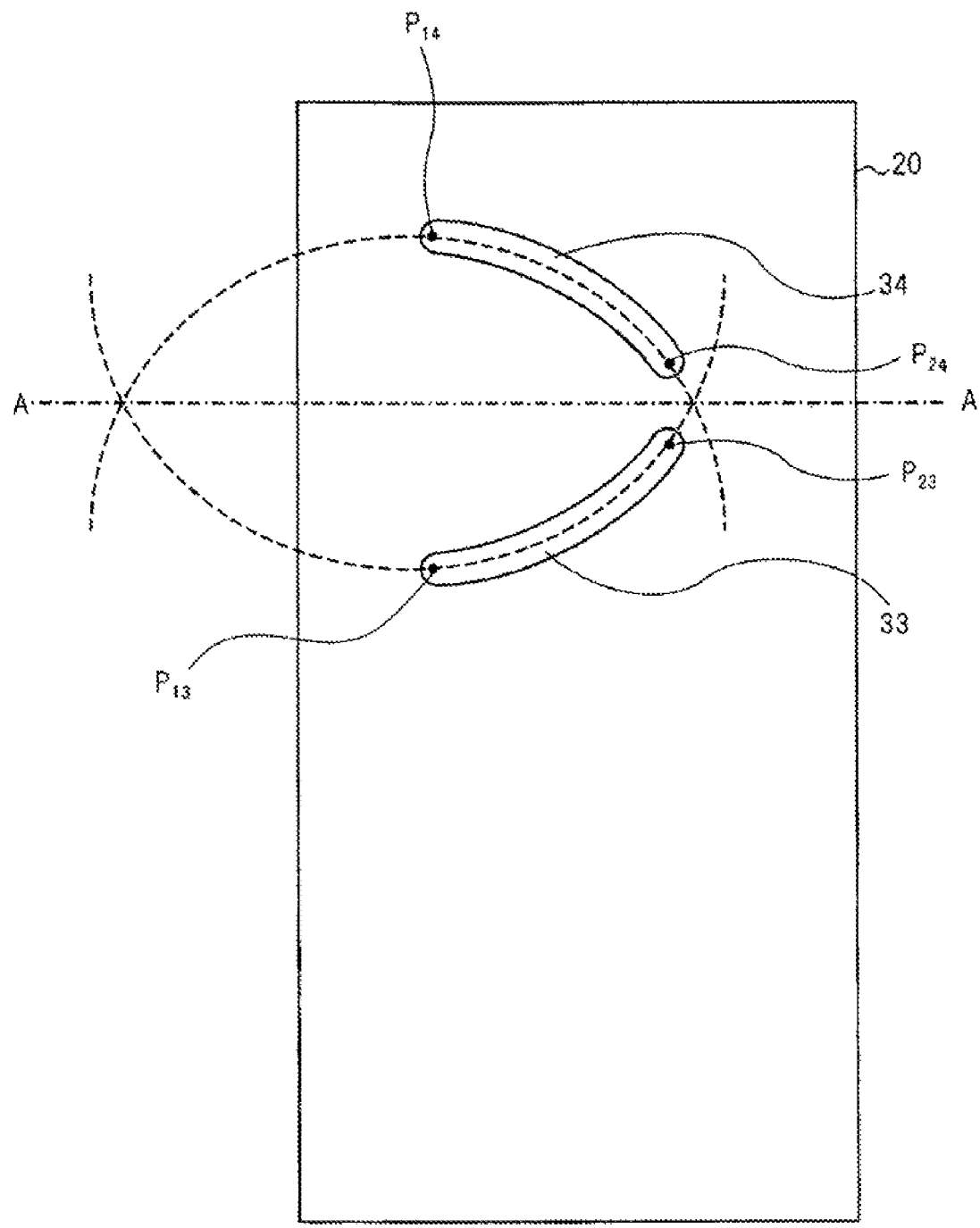
FIG. 5 is a schematic plan view showing the front surface of a lower housing.

FIG. 5 is a schematic diagram of the front surface of lower housing 20. As shown in FIG. 5, third guide groove 33 and fourth guide groove 34 are formed in the front surface of lower housing 20. Third guide groove 33 and fourth guide groove 34 are line-symmetric with respect to center line A-A of upper housing 10 in the first open state (FIG. 1(b)); the center line A-A serves as the axis of symmetry.

Furthermore, third guide groove 33 is formed along a circular arc centered around one end (start point $P_{14}$) of fourth guide groove 34. Moreover, the length of the circular arc (the circular arc length of third guide groove 33) is a quarter of the circumference of a circle centered around start point $P_{14}$. Of course, the circular arc length of third guide groove 33 may be shorter than a quarter of the circumference of a circle centered around start point $P_{14}$.

On the other hand, fourth guide groove 34 is formed along a circular arc centered around one end (start point $P_{13}$) of third guide groove 33. Moreover, the length of the circular arc (the circular arc length of fourth guide groove 34) is a quarter of the circumference of a circle centered around start point $P_{13}$. Of course, the circular arc length of fourth guide groove 34 may be shorter than a quarter of the circumference of a circle centered around start point $P_{13}$.

Moreover, the circle centered around start point $P_{14}$ has the same radius as that of the circle centered around start point $P_{13}$. That is, third guide groove 33 and fourth guide groove 34 have the same length and the same radius of curvature.

Figure 6:
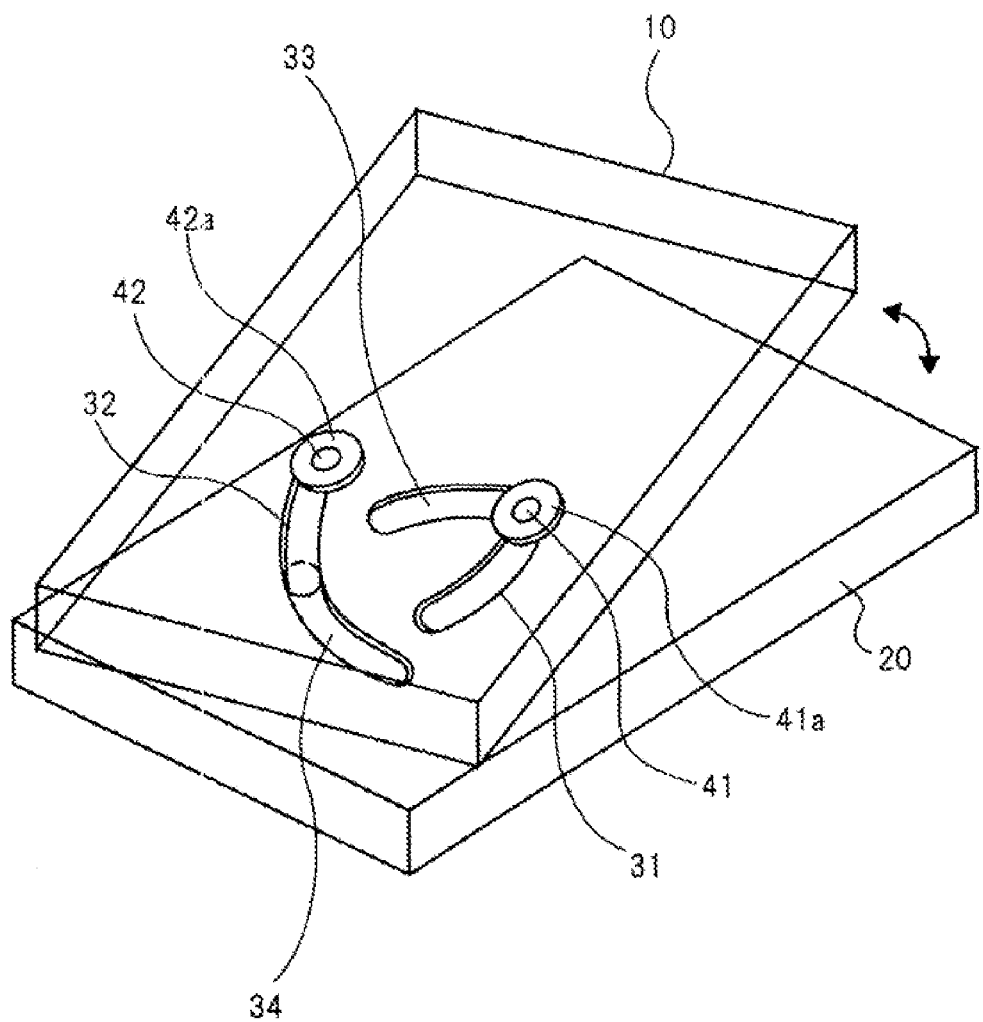
FIG. 6 is a schematic diagram showing how the upper housing and the lower housing are connected together.

FIG. 6 schematically shows how upper housing 10 and lower housing 20 are connected together. As shown in FIG. 6, upper housing 10 and lower housing 20 are rotatably connected together by two shaft pins 41 and 42. In other words, upper housing 10 and lower housing 20 are connected together so as to be able to be shifted, by a rotating operation, from the closed state, the first open state or the second open state to the another state. Specifically, upper housing 10 and lower housing 20 are connected together by first shaft pin 41 penetrating first guide groove 31 and third guide groove 33 and second shaft pin 42 penetrating second guide groove 32 and fourth guide groove 34 as described above. That is, the connecting mechanism is composed of first guide groove 31 to fourth guide groove 34, first shaft pin 41, and second shaft pin 42.

First shaft pin 41 has flange portions 41a arranged at the respective ends thereof with each having a diameter larger than the width of each of first guide groove 31 and third guide groove 33. Flange portions 41a are engaged on the peripheries of first guide groove 31 and third guide groove 33 to prevent first shaft pin 41 from slipping out from first guide groove 31 and third guide groove 33. Second shaft pin 42 has flange portions 42a arranged at the respective ends thereof with each having a diameter larger than the width of each of second guide groove 32 and fourth guide groove 34. Flange portions 42a are engaged on the peripheries of second guide groove 32 and fourth guide groove 34 to prevent second shaft pin 42 from slipping out from second guide groove 32 and fourth guide groove 34. FIG. 6 shows only flange portions 41a and 42a each provided at one end of the corresponding one of first shaft pin 41 and second shaft pin 42. However, similar flange portions are also provided at the respective other ends of first shaft pin 41 and second shaft pin 42.

Now, with reference to FIG. 7 to FIG. 9, the relative positional relationship between first guide groove 31 to fourth guide groove 34 observed in the closed state, the first open state, and the second open state will be described. The relative positional relationship changes with the state of the device over time. However, here, the relative positional relationship in each state, and the process of the change will be described below in detail.

Figure 7:
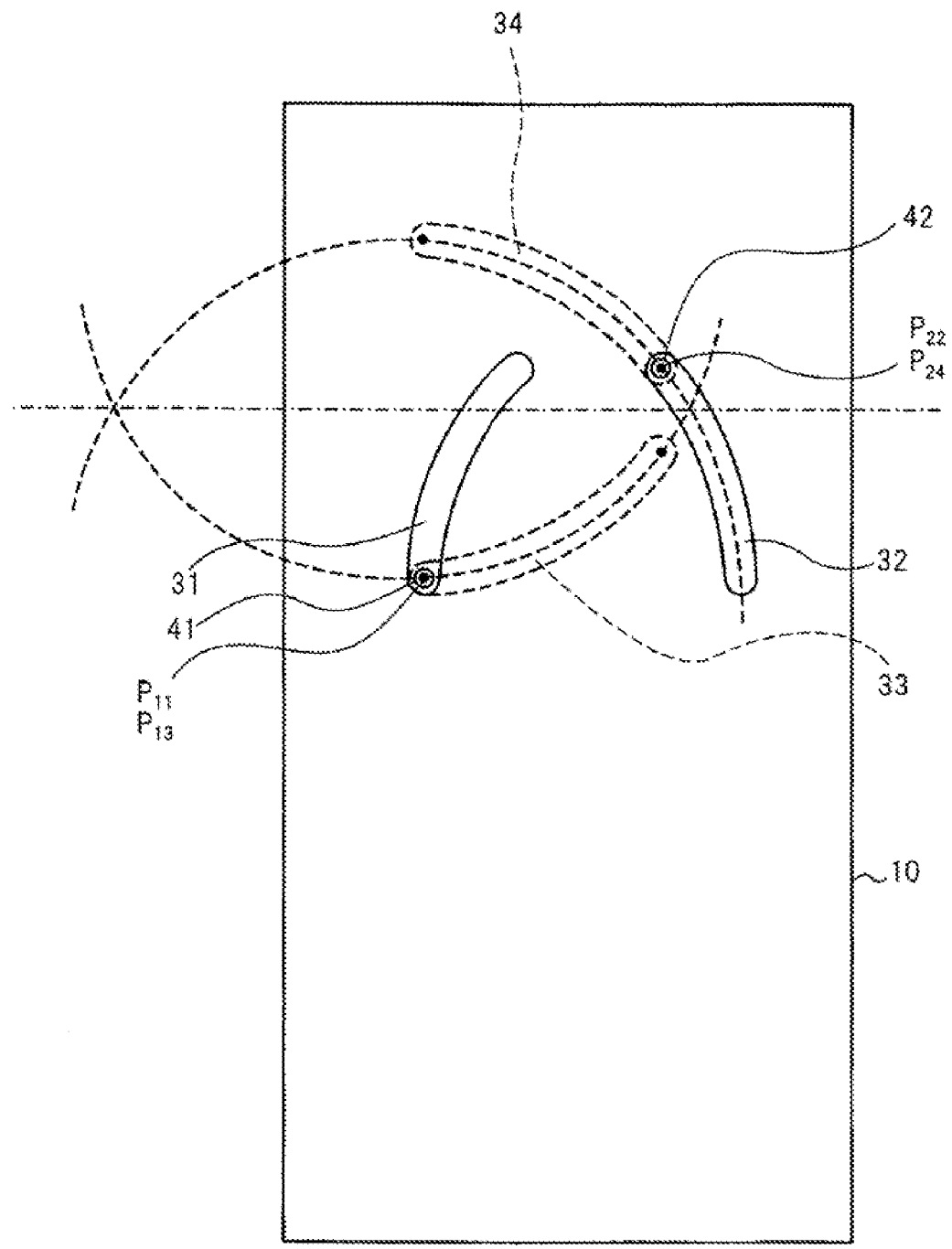
FIG. 7 is a schematic diagram showing the relative positional relationship among a first guide groove to a fourth guide groove in the closed state.

FIG. 7 shows the relative positional relationship among first guide groove 31 to fourth guide groove 34 in the closed state. As shown in FIG. 7, in the closed state, start point $P_{11}$ of first guide groove 31 aligns with start point $P_{13}$ of third guide groove 33. Furthermore, end point $P_{22}$ of second guide groove 32 aligns with end point $P_{24}$ of fourth guide groove 34. An end point means the point of each guide groove located opposite the start point thereof. In the description below, the end point of first guide groove 31 is referred to as an "end point $P_{21}$". The end point of third guide groove 33 is referred to as an "end point $P_{23}$" (see FIGS. 4 and 5).

FIG. 7 is referred to again. In the closed state, first shaft pin 41 is present at start point $P_{11}$ of first guide groove 31 and start point $P_{13}$ of third guide groove 33 which are aligned with each other as described above. More specifically, first shaft pin 41 is positioned at the point where two start points $P_{11}$ and $P_{13}$ overlap and is temporarily locked by a locking mechanism (not shown in the drawings). On the other hand, second shaft pin 42 is present at end point $P_{22}$ of second guide groove 32 and end point $P_{24}$ of fourth guide groove 34 which are aligned with each other as described above. More specifically, second shaft pin 42 is positioned at the point where two end points $P_{22}$ and $P_{24}$ overlap and is temporarily locked by a locking mechanism (not shown in the drawings). In FIG. 7, illustration of flange portions 41a and 42a (FIG. 4) of shaft pins 41 and 42 is omitted.

Figure 8:
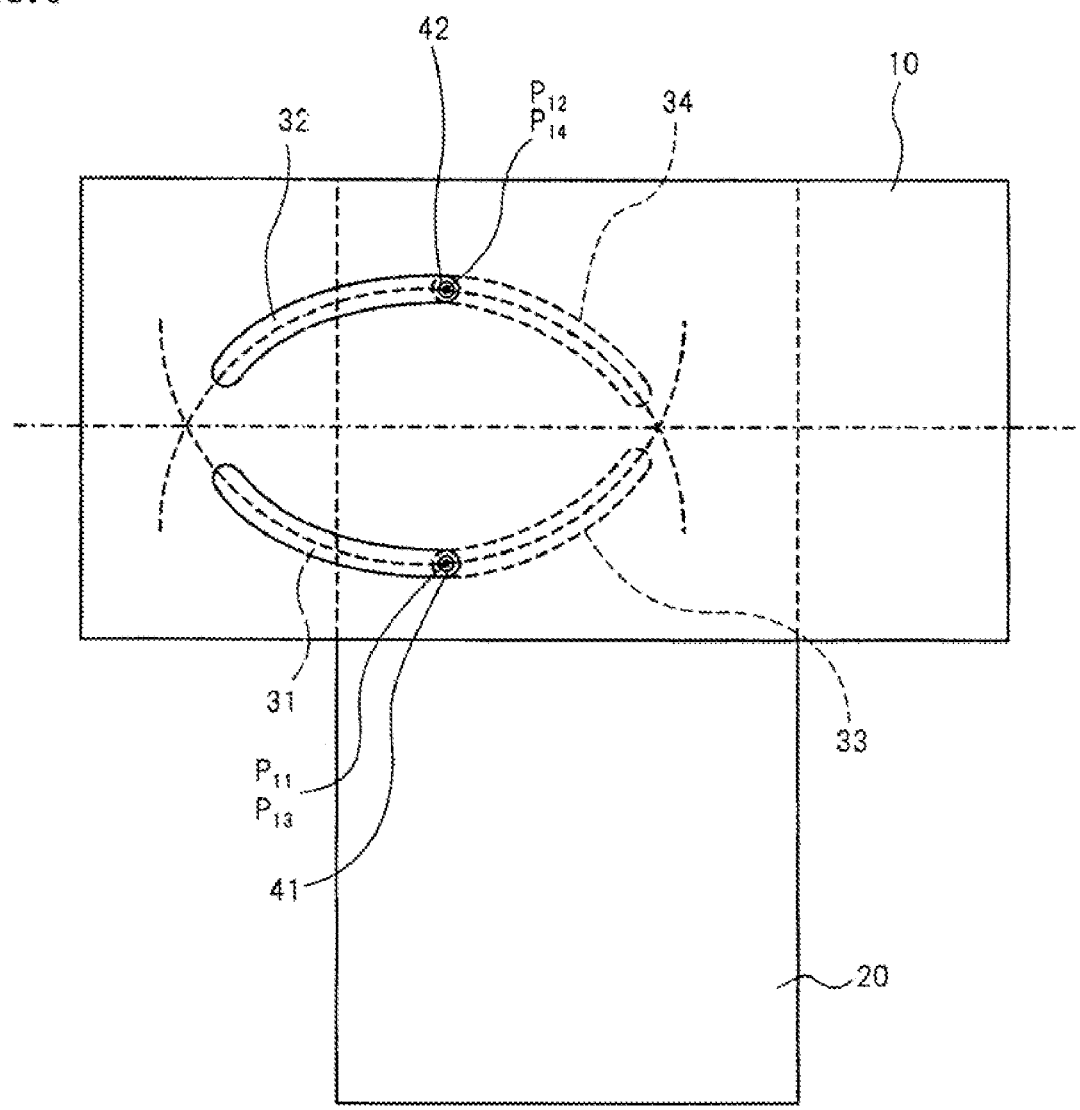
FIG. 8 is a schematic diagram showing the relative positional relationship among the first guide groove to the fourth guide groove in the first open state.

FIG. 8 shows the relative positional relationship among first guide groove 31 to fourth guide groove 34 in the first open state. As shown in FIG. 8, in the first open state, start point $P_{11}$ of first guide groove 31 aligns with start point $P_{13}$ of third guide groove 33. Furthermore, start point $P_{12}$ of second guide groove 32 aligns with start point $P_{14}$ of fourth guide groove 34.

Now, attention is focused on two shaft pins 41 and 42. First shaft pin 41 positioned at the point where start point $P_{11}$ of first guide groove 31 and start point $P_{13}$ of third guide groove 33 overlap in the closed state is not displaced during a shifting process from the closed state to the first open state. First shaft pin 41 thus continues to remain at the point where start points $P_{11}$ and $P_{13}$ overlap. On the other hand, second shaft pin 42 which is temporarily engaged at the point where end point $P_{22}$ of second guide groove 32 and end point $P_{24}$ of fourth guide groove 34 overlap in the closed state is unengaged during the shifting process from the closed state to the first open state.

Finally, second shaft pin 42 moves to the point where start point $P_{12}$ of second guide groove 32 and start point $P_{14}$ of fourth guide groove 34 overlap. Moreover, second shaft pin 42 which is moved to the point where start point $P_{12}$ of second guide groove 32 and start point $P_{14}$ of fourth guide groove 34 overlap is temporarily engaged by an engaging mechanism (not shown in the drawings). The process in which second shaft pin 42 moves will be described below.

Figure 9:
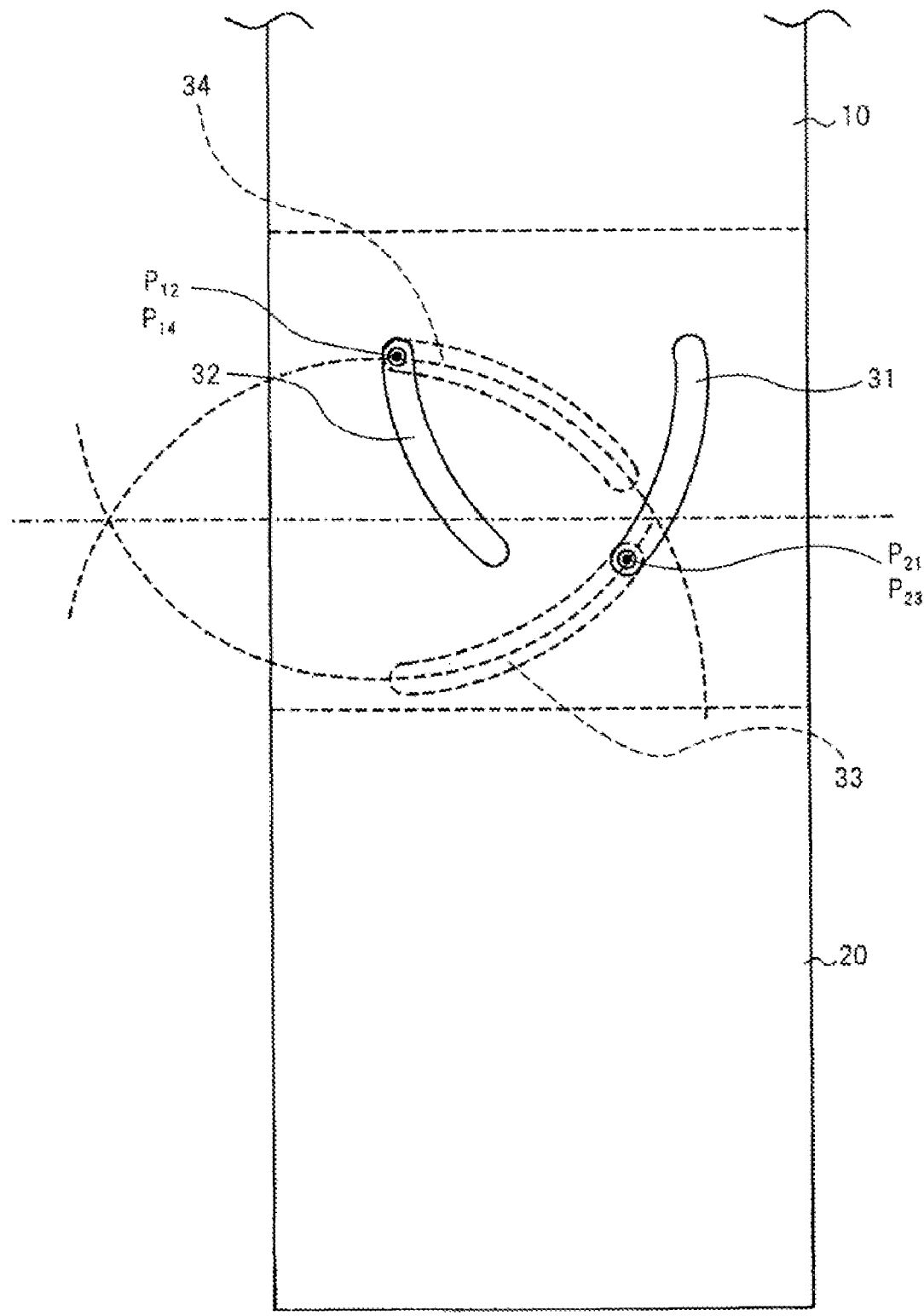
FIG. 9 is a schematic diagram showing the relative positional relationship among the first guide groove to the fourth guide groove in the second open state.

FIG. 9 shows the relative positional relationship among first guide groove 32 to fourth guide groove 34 in the second open state. As shown in FIG. 9, in the second open state, end point $P_{21}$ of first guide groove 31 aligns with end point $P_{23}$ of third guide groove 33. Furthermore, start point $P_{12}$ of second guide groove 32 aligns with start point $P_{14}$ of fourth guide groove 34.

Now, attention is focused on two shaft pins 41 and 42. First shaft pin 41 which is temporarily engaged at the point where start point $P_{11}$ of first guide groove 31 and start point $P_{13}$ of third guide groove 33 overlap in the first open state is unengaged during a shifting process from the first open state to the second open state. Finally, first shaft pin 41 moves to the point where end point $P_{21}$ of first guide groove 31 and end point $P_{23}$ of third guide groove 33 overlap. Moreover, first shaft pin 41 which is moved to the point where end point $P_{21}$ of first guide groove 31 and end point $P_{23}$ of third guide groove 33 overlap is temporarily engaged by an engaging mechanism (not shown in the drawings). The process in which first shaft pin 41 moves will be described below. On the other hand, second shaft pin 42 positioned at the point where start point $P_{12}$ of second guide groove 32 and start point $P_{14}$ of fourth guide groove 34 overlap in the first open state is not displaced during the shifting process from the first open state to the second open state. Second shaft pin 42 thus continues to remain at the point where start points $P_{12}$ and $P_{14}$ overlap.

Now, the following will be described: the rotating operation of upper housing 10 and lower housing 20, the resulting change in the relative positional relationship among first guide groove 31 to fourth guide groove 34, and the movement of shaft pins 41 and 42. Upper housing 10 and lower housing 20 can be rotated relative to each other. However, the description herein is based on the assumption that lower housing 20 is fixed, whereas upper housing 10 is rotated.

Figure 10:
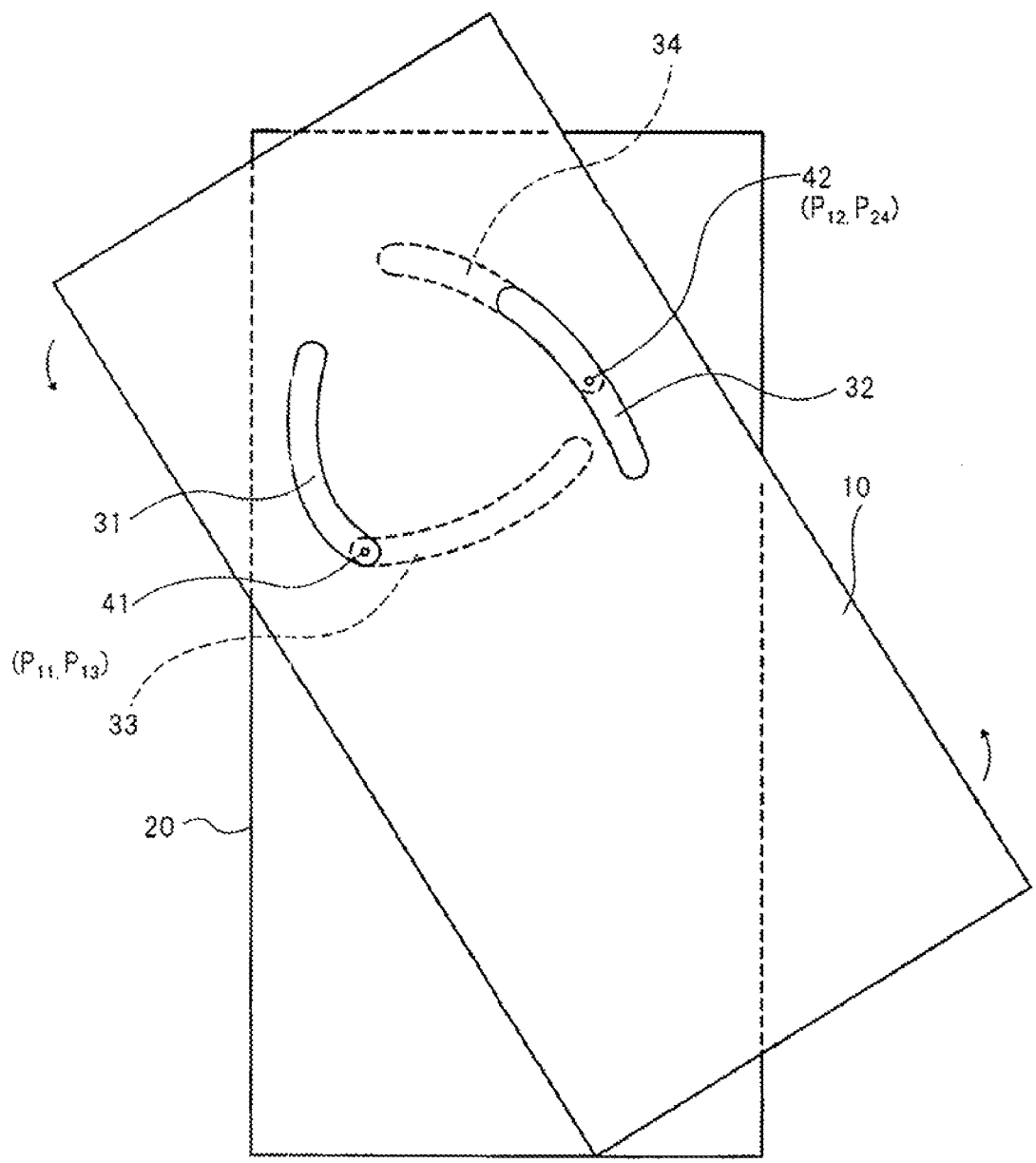
FIG. 10 is a schematic diagram showing the positional relationship between the guide grooves and shaft pins observed during a shifting process from the closed state to the first open state.

To allow the state (closed state) shown in FIG. 7 to shift to the state (first open state) shown in FIG. 8, a counterclockwise rotating force is exerted on upper housing 10 shown in FIG. 7. For example, lower housing 20 is gripped with the left hand, and upper housing 10 is rotated counterclockwise with the right hand. Alternatively, with the cellular phone on the palm of the left hand, push the lower side surface of upper housing 10 in upper leftward direction with the thumb of the left hand. Then, as shown in FIG. 10, upper housing 10 on which the rotating force has been exerted starts rotating counterclockwise around first shaft pin 41 which is positioned at the point where start point $P_{11}$ of first guide groove 31 and start point $P_{13}$ of third guide groove 33 overlap; in this case, first shaft pin 41 serves as a rotating shaft. At this time, second guide groove 32 moves over and along fourth guide groove 34 (second guide groove 32 traces fourth guide groove 34). On the other hand, first guide groove 31 rotates counterclockwise around first shaft pin 41 (start point $P_{11}$), that serves as a rotating shaft. At this time, second shaft pin 42 which is positioned at the point where end point $P_{22}$ of second guide groove 32 and end point $P_{24}$ of fourth guide groove 34 overlap does not move but remains at the overlapping point. Furthermore, the engaging of second shaft pin 42 by the engaging mechanism is not canceled.

Figure 11:
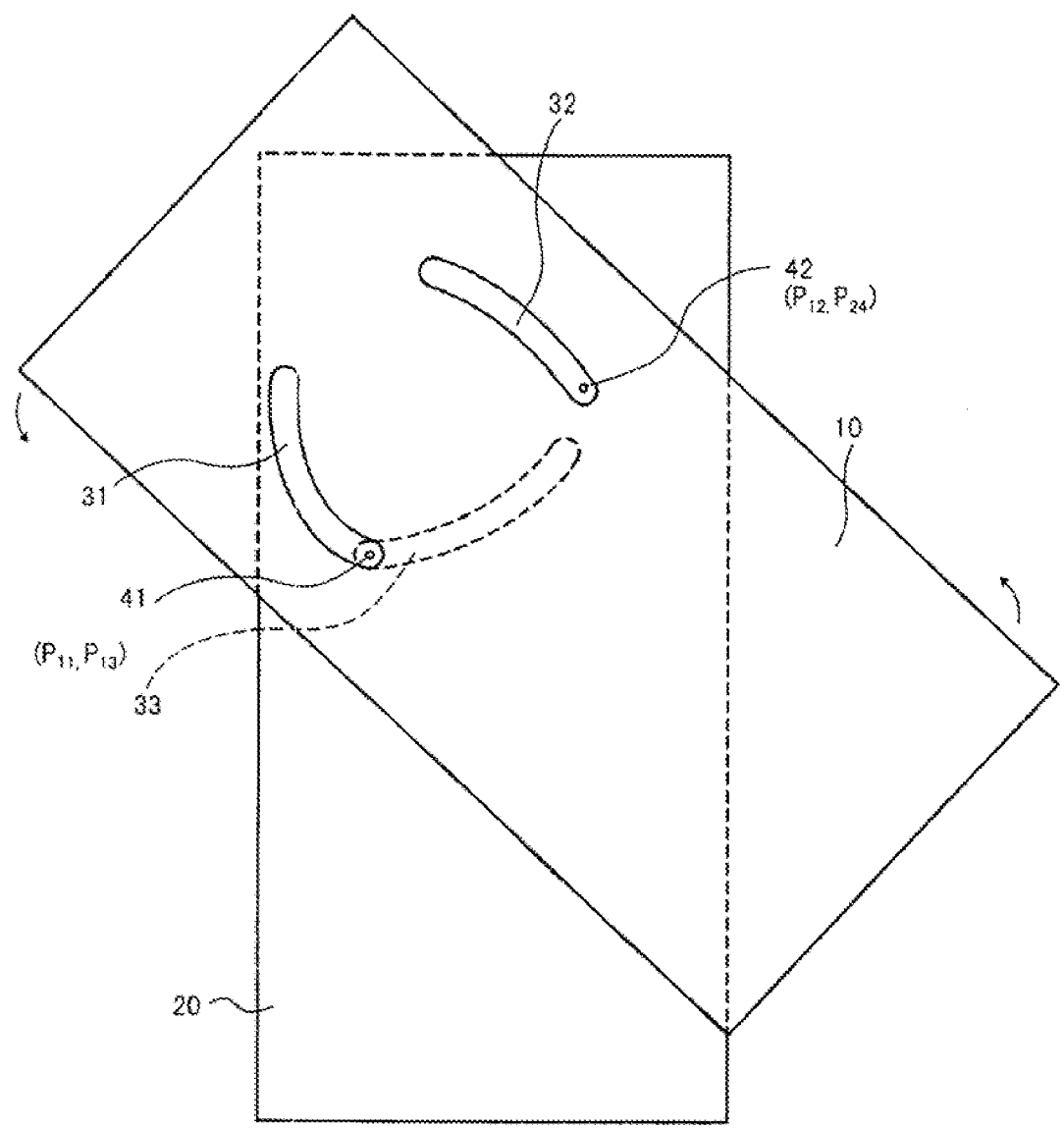
FIG. 11 is a schematic diagram showing the positional relationship between the guide grooves and shaft pins observed during the shifting process from the closed state to the first open state.

Thereafter, rotating upper housing 10 further counterclockwise allows second guide groove 32 to completely overlap fourth guide groove 34 as shown in FIG. 11. That is, start point $P_{12}$ of second guide groove 32 aligns with end point $P_{24}$ of fourth guide groove 34. The inner surface of second guide groove 32 abuts against second shaft pin 42. In other words, end point $P_{22}$ of second guide groove 32 aligns with start point $P_{14}$ of fourth guide groove 34. In the meantime, first guide groove 31 rotates counterclockwise around first shaft pin 41 (start point $P_{11}$), that serves as a rotating shaft.

In the state shown in FIG. 11, upper housing 10 is rotated further counterclockwise. Then, the inner surface of second guide groove 32 pushes second shaft pin 42. When the pressing force exerted on second shaft pin 42 exceeds a predetermined value, the engaging of second shaft pin 42 by the engaging mechanism is canceled. Then, upper housing 10 can be further rotated. Thereafter, as upper housing 10 rotates, second guide groove 32 moves along fourth guide groove 34 while pushing second shaft pin 42. In the meantime, second shaft pin 42 also moves through fourth guide groove 34 from end point $P_{24}$ toward start point $P_{14}$ of fourth guide groove 34. Furthermore, first guide groove 31 rotates counterclockwise around first shaft pin 41 (start point $P_{11}$), that serves as a rotating shaft. As described above, the closed state shown in FIG. 7 shifts to the open state shown in FIG. 8.

As described above, during the shifting process from the closed state to the first open state, first shaft pin 4I serves as a rotating shaft for upper housing 10. Furthermore, second guide groove 32 traces fourth guide groove 34. Moreover, second shaft pin 42 is pushed by second guide groove 32 to move from end point $P_{24}$ to start point $P_{14}$ of fourth guide groove 34 in fourth guide groove 34. Second shaft pin 42 which has been moved to start point $P_{14}$ (which overlaps start point $P_{12}$ of second guide groove 32) of fourth guide groove 34 is temporarily engaged by the engaging mechanism. Thus, upper housing 10 and lower housing 20 are temporarily locked in the first open state.

Figure 12:
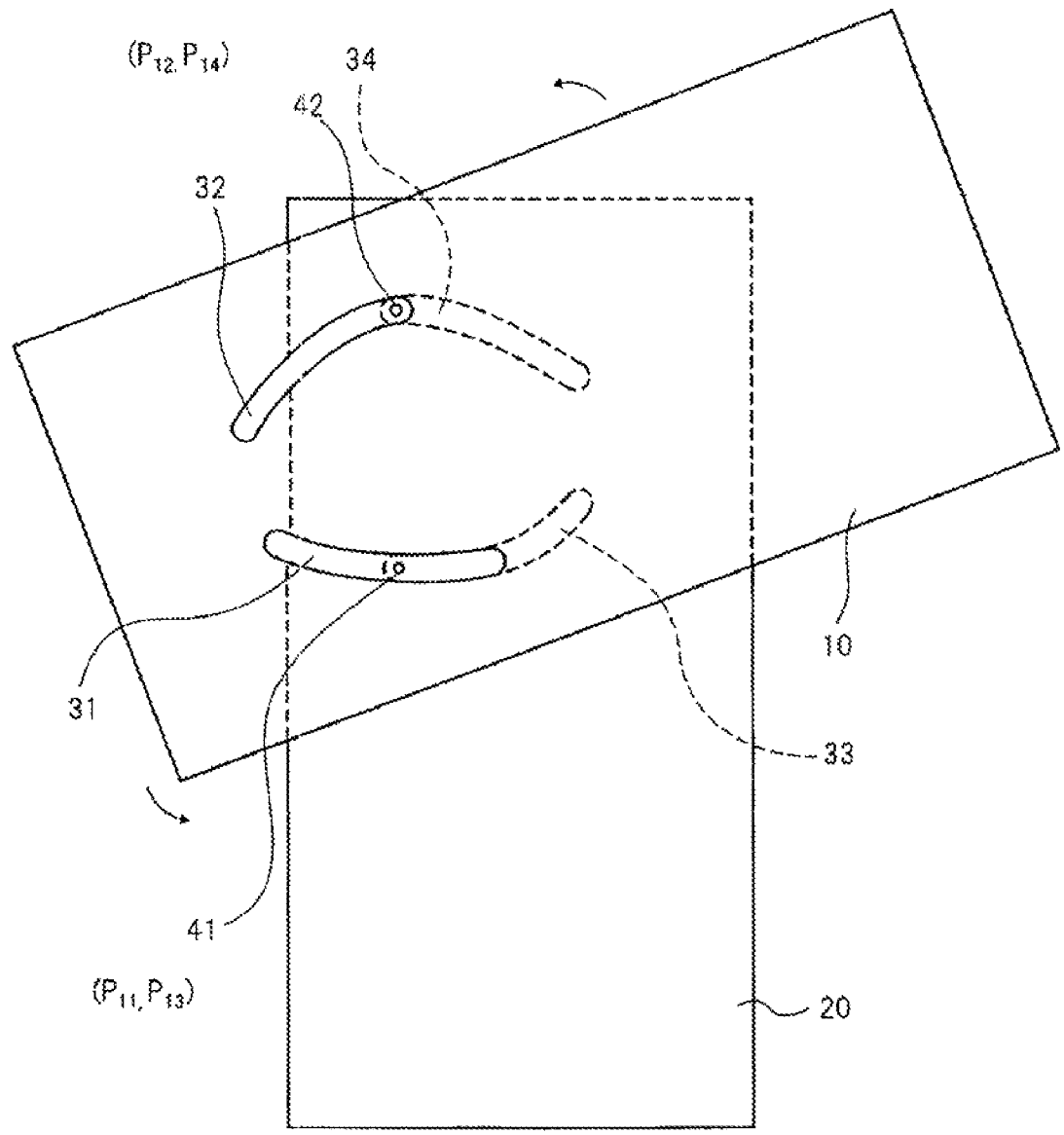
FIG. 12 is a schematic diagram showing the positional relationship between the guide grooves and shaft pins observed during a shifting process from the first open state to the second open state.

Now, how the first open state shown in FIG. 8 shifts to the second open state shown in FIG. 9 will be described. To allow the first open state to shift to the second open state, a force acting to rotate upper housing 10 shown in FIG. 8, counterclockwise, is exerted on upper housing 10 shown in FIG. 8. For example, lower housing 20 is gripped with the left hand, and upper housing 10 is rotated counterclockwise with the right hand. Then, as shown in FIG. 12, upper housing 10 on which the rotating force has been exerted starts rotating counterclockwise around second shaft pin 42 positioned at the point where start point $P_{12}$ of second guide groove 32 and start point $P_{14}$ of fourth guide groove 34 overlap; in this case, second shaft pin 42 serves as a rotating shaft. At this time, first guide groove 31 moves over and along third guide groove 33 (first guide groove 31 traces third guide groove 33). On the other hand, second guide groove 32 rotates counterclockwise around second shaft pin 42 (start point $P_{12}$), that serves as a rotating shaft. At this time, first shaft pin 41 which is positioned at the point where start point $P_{11}$ of first guide groove 31 and start point $P_{13}$ of third guide groove 33 overlap does not move but remains at the overlapping point. Furthermore, the engaging of first shaft pin 41 by the engaging mechanism is not canceled.

Figure 13:
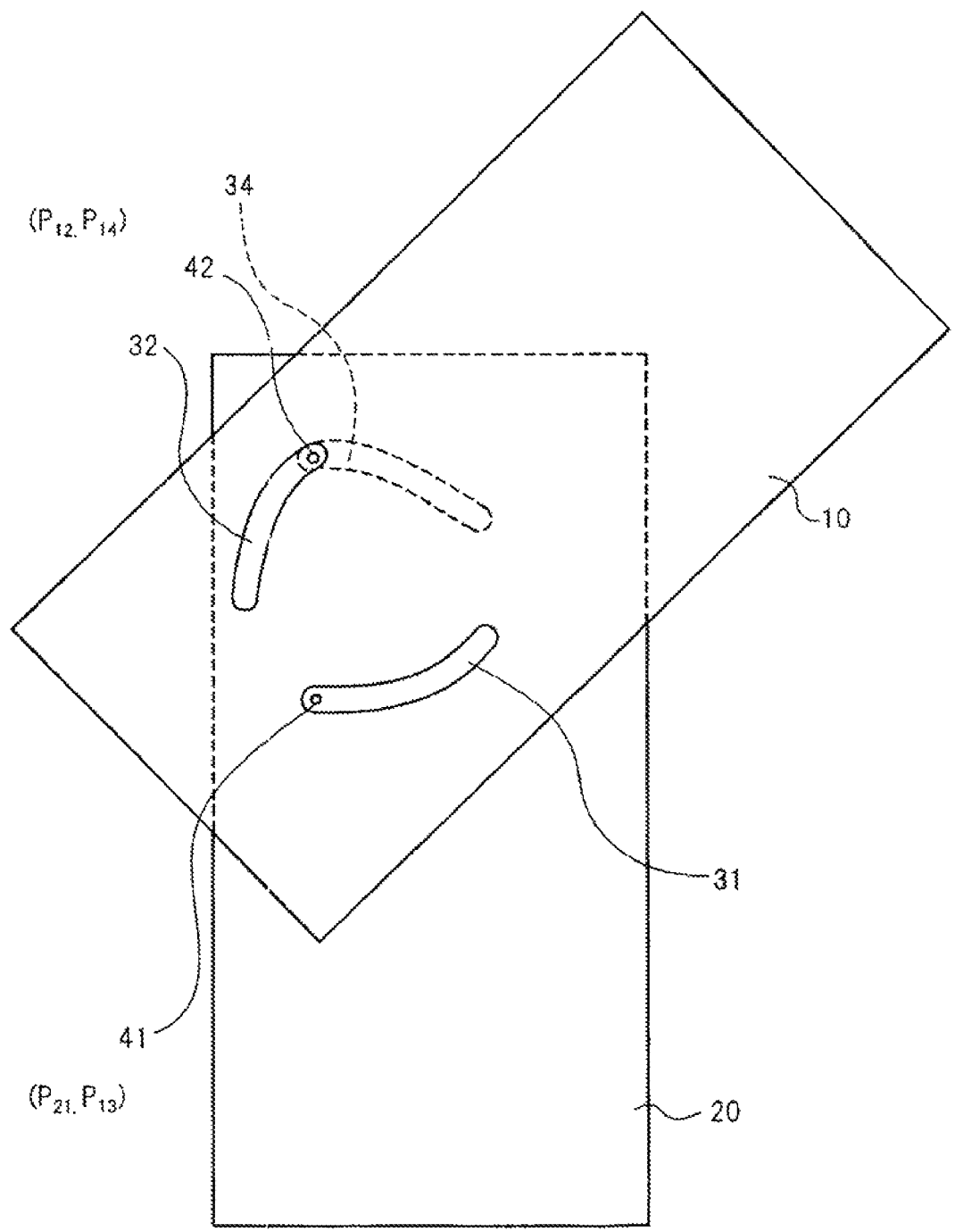
FIG. 13 is a schematic diagram showing the positional relationship between the guide grooves and shaft pins observed during the shifting process from the first open state to the second open state.

Thereafter, when upper housing 10 is further rotated counterclockwise, first guide groove 31 completely overlaps third guide groove 33 as shown in FIG. 13. That is, end point $P_{21}$ of first guide groove 31 aligns with end point $P_{23}$ of third guide groove 33. The inner surface of first guide groove 31 abuts against first shaft pin 41. In other words, start point $P_{11}$ of first guide groove 32 aligns with end point $P_{23}$ of third guide groove 33. In the meantime, second guide groove 32 rotates counterclockwise around second shaft pin 42 (start point $P_{12}$), that serves as a rotating shaft.

In the state shown in FIG. 13, upper housing 10 is rotated further counterclockwise. Then, the inner surface of first guide groove 31 pushes first shaft pin 41. When the pressing force exerted on first shaft pin 41 exceeds a predetermined value, the engaging of first shaft pin 41 by the engaging mechanism is canceled. Then, upper housing 10 can further be rotated. Thereafter, as upper housing 10 rotates, first guide groove 31 moves along third guide groove 33 while pushing first shaft pin 41. In the meantime, first shaft pin 41 also moves through and along third guide groove 33. Furthermore, second guide groove 32 rotates counterclockwise around second shaft pin 42 (start point $P_{12}$), that serves as a rotating shaft. As described above, the first open state shown in FIG. 8 shifts to the second open state shown in FIG. 9.

As described above, during the shifting process from the first open state to the second open state, second shaft pin 42 serves as a rotating shaft for upper housing 10. Furthermore, first guide groove 31 traces third guide groove 33. Moreover, first shaft pin 41 is pushed by first guide groove 31 to move from start point $P_{13}$ to end point $P_{23}$ of third guide groove 33 in third guide groove 33. And then, first shaft pin 41 which has been moved to end point $P_{23}$ (which overlaps end point $P_{21}$ of first guide groove 31) of third guide groove 33 is temporarily engaged by the engaging mechanism. Thus, upper housing 10 and lower housing 20 are temporarily locked in the second open state.

As described above, upper housing 10 and lower housing 20 can be shifted from the closed state to the first open state and then to the second open state. Rotation in the direction opposite to that described above enables shifting from the second open state to the first open state and then to the closed state (upper housing 10 and lower housing 20 can be returned to the original state). A change in state also automatically rotates images or videos displayed on the liquid crystal display.

The diameters of first shaft pin 41 and second shaft pin 42 in FIG. 10 to FIG. 13 are shown to be smaller than the actual ones for convenience of drawing the figures. In actuality, the diameter of each of first shaft pin 41 and second shaft pin 42 is substantially the same as the width of each of guide grooves 31 to 34. Thus, first shaft pin 41 and second shaft pin 42 are prevented from rattling in guide grooves 31 to 34.

The closed state is suitable for the utilization of an application not requiring the operation of the input keys. For example, if a camera is provided on the rear surface of lower housing 20 and an operation button (for example, a shutter button) is provided on a side surface of upper housing 10 or lower housing 20, the user operates the operation button while checking an image taken with the camera, on the liquid crystal display provided on upper housing 10. The above-described closed state is suitable for this situation. The above-described closed state is also suitable for viewing one segment broadcasting on the liquid crystal display provided on upper housing 10.

In the first open state, center line A-A of upper housing 10 and center line B-B of lower housing cross at right angles to expose the input keys provided on lower housing 20. That is, the liquid crystal display provided on upper housing 10 is placed in a horizontally long position so as to enable the input keys provided on lower housing 20 to be operated. Thus, the first open state is suitable for browsing of Web pages and the like. The browsing of Web pages requires operations such as inputting of URLs through operation of the input keys. Consequently, not the closed state but the first open state is suitable for browsing. The first open state is also suitable for the case where the input keys need to be operated during viewing of one segment broadcasting.

In the second open state, center line A-A of upper housing 10 aligns with center line B-B of lower housing on the same straight line. That is, the liquid crystal display provided on upper housing 10 is placed in a vertically long position to enable the input keys provided on lower housing 20 to be operated. Thus, the device is set to substantially the same open state as that of a conventional flip phone, which is suitable for calls, browsing, the creation of e-mails and the like.

The counterclockwise rotation of upper housing 10 with respect to lower housing 20 has been described. However, by forming first guide groove 31 and third guide groove 33 in lower housing 20 and by forming second guide groove 32 and fourth guide groove 34 in upper housing 10, upper housing 10 can be rotated clockwise with respect to lower housing 20. Furthermore, the clockwise rotation can be performed by rotating third guide groove 33 and fourth guide groove 34 shown in FIG. 5, in the opposite direction.

Additionally, the first or second guide groove may be formed so that the grooves are offset from the center line of the housing. Positioning the first or second guide groove so that the grooves are offset from the center line makes the upper housing in the first open state and the lower housing laterally asymmetric. Thus, the center of the liquid display provided on the upper housing is located offset leftward or rightward from center line A-A of the lower housing. For example, if the lower housing is held with the right hand, the cellular phone is easier to use when the center of the liquid crystal display is positioned on the left side of the center line A-A of the lower housing. This is because, provided that the center of the liquid crystal display is positioned on the left side of center line A-A of the lower housing, the liquid crystal display can be positioned in front of the user's face without the need to move the right hand holding the lower housing, to the front of the user's face.

If the lower housing is held with the left hand, provided that the center of the liquid crystal display is positioned on the right side of center line A-A of the lower housing, the liquid crystal display can be positioned in front of the user's face without the need to move the left hand holding the lower housing, to the front of the user's face. The upper housing in the first open state may be positioned so that it is offset from the center line of the lower housing for design reasons.

As described above, in the present invention, the guide grooves are distributively formed in both of the two housings which configure the portable electronic device; the guide grooves are required to connect the two housings so that the housings are rotatable. Thus, compared to the case where guide grooves required to obtain a desired rotation amount are formed in only one of the housings, the present invention enables a reduction in the length of the guide grooves formed in each of the housings. As a result, the area of the guide grooves (slots) present in the surface of each housing is reduced to avoid a decrease in the rigidity of the housing. Moreover, the guide grooves formed in each housing are prevented from crossing the guide grooves in the other housing. This in turn prevents the shaft moving through the guide groove from being caught on a corner in the guide groove or entering into unintended guide groove.

In the present specification, the exemplary embodiment has been described taking the cellular phone by way of example. However, the present invention is applicable to portable electronic devices other than the cellular phone.

The present application is the National Phase of PCT/JP2008/055926, filed Mar. 27, 2008, which claims priority based on Japanese Patent Application No. 2007-143781 filed on May 30, 2007 and Japanese Patent Application No. 2008-9267 filed on Jan. 18, 2008 and incorporates the disclosures of the applications herein in entirety.

The invention claimed is:

1. A portable electronic device comprising:
a first housing with a display section;
a second housing with an operation section;
a connecting mechanism connecting said first housing and said second housing together so as to allow said first housing and said second housing to be shifted, by a rotating operation, from a closed state, a first open state or a second open state to another state, wherein in the closed state, the operation section of said second housing is covered with said first housing, and in the first open state, said operation section is exposed and a center line of said first housing and a center line of said second housing cross each other, and in the second open state, said operation section is exposed and the center line of said first housing aligns with the center line of the second housing, wherein said connecting mechanism comprises:
a first guide groove and a second guide groove formed in said first housing;
a third guide groove and a fourth guide groove formed in said second housing;
a first shaft penetrating said first guide groove and said third guide groove; and
a second shaft penetrating said second guide groove and said fourth guide groove,
said first guide groove and said second guide groove are line-symmetric with respect to the center line of said first housing serving as an axis of symmetry,
said first guide groove is formed along a circular arc centered around a start point of said second guide groove,
said second guide groove is formed along a circular arc centered around a start point of said first guide groove,
in said first open state, said third guide groove and said fourth guide groove are line-symmetric with respect to the center line of said first housing serving as an axis of symmetry,
said third guide groove is formed along a circular arc centered around a start point of said fourth guide groove, and
said fourth guide groove is formed along a circular arc centered around a start point of said third guide groove.

2. The portable electronic device according to claim 1, wherein in the closed state, said start point of said first guide groove aligns with said start point of said third guide groove, an end point of said second guide groove aligns with an end point of said fourth guide groove, said first shaft is positioned at a point where said start point of said first guide groove and said start point of said third guide groove overlap, and said second shaft is positioned at a point where said end point of said second guide groove and said end point of said fourth guide groove overlap, in the first open state, said start point of said first guide groove aligns with said start point of said third guide groove, said start point of said second guide groove aligns with said start point of said fourth guide groove, said first shaft is positioned at the point where said start point of said first guide groove and said start point of said third guide groove overlap, and said second shaft is positioned at the point where said start point of said second guide groove and said start point of said fourth guide groove overlap, and in the second open state, an end point of said first guide groove aligns with an end point of said third guide groove, said start point of said second guide groove aligns with said start point of said fourth guide groove, said first shaft is positioned at the point where said end point of said first guide groove and said end point of said third guide groove overlap, and said second shaft is positioned at the point where said start point of said second guide groove and said start point of said fourth guide groove overlap.

3. The portable electronic device according to claim 1, wherein when the closed state shifts to the first open state, said first housing and said second housing rotate around said first shaft serving as an axis of rotation, and said second shaft moves from said start point to said end point of said fourth guide groove in said fourth guide groove, and when the first open state shifts to the second open state, said first housing and said second housing rotate around said second shaft serving as an axis of rotation, and said first shaft moves from said start point to said end point of said third guide groove in said third guide groove.

4. The portable electronic device according to claim 1, wherein said first guide groove has a circular arc length corresponding to a quarter of a circumference of a circle centered around said start point of said second guide groove, said second guide groove has a circular arc length corresponding to a quarter of a circumference of a circle centered around said start point of said first guide groove, said third guide groove has a circular arc length corresponding to a quarter of a circumference of a circle centered around said start point of said fourth guide groove, and said fourth guide groove has a circular arc length corresponding to a quarter of a circumference of a circle centered around said start point of said third guide groove.

5. The portable electronic device according to claim 1, wherein in the first open state, said operation section of said second housing is exposed, said first housing is rotated by substantially 90 degrees with respect to said second housing, and opposite side surfaces of said first housing in a long side direction are positioned outside opposite side surfaces of said second housing in a short side direction, and in the second open state, said operation section is exposed and said first housing is further rotated by substantially 90 degrees from the first open state.

6. The portable electronic device according to claim 5, wherein in the first open state, a center of the display section provided in said first housing is located on the center line of said second housing.

7. The portable electronic device according to claim 5, wherein in the first open state, a center of said display section provided in said first housing is located offset either leftward or rightward from the center line of said second housing.

* * * * *